(12) United States Patent
Spitz

(10) Patent No.: US 8,605,953 B1
(45) Date of Patent: Dec. 10, 2013

(54) HAND OPERATED LINE VERIFIER WITH POSITION DETERMINING MODULE

(75) Inventor: Glenn S. Spitz, Boulder, CO (US)

(73) Assignee: Webscan, Inc., Longmont, CO (US)

( * ) Notice: Subject to any disclaimer, the term of this patent is extended or adjusted under 35 U.S.C. 154(b) by 252 days.

(21) Appl. No.: 12/976,061

(22) Filed: Dec. 22, 2010

(51) Int. Cl.
*G06K 9/00* (2006.01)

(52) U.S. Cl.
USPC ............ 382/112; 250/559.06; 235/462.01; 348/94

(58) Field of Classification Search
USPC ........ 382/100, 112, 181, 183, 190, 195, 201; 250/559.06, 559.01, 559.04; 235/462.01–462.14; 270/52.02; 348/92, 94, 135
See application file for complete search history.

(56) References Cited

U.S. PATENT DOCUMENTS

| | | | |
|---|---|---|---|
| 3,790,756 A * | 2/1974 | Graves et al. | 235/462.02 |
| 4,720,699 A * | 1/1988 | Smith | 341/13 |
| 4,901,073 A * | 2/1990 | Kibrick | 341/13 |
| 5,241,164 A * | 8/1993 | Pavlidis et al. | 235/462.12 |
| 5,355,146 A | 10/1994 | Chiu et al. | |
| 5,729,001 A * | 3/1998 | Spitz | 235/462.01 |
| 6,012,638 A * | 1/2000 | Ackley et al. | 235/462.01 |
| 6,084,691 A | 7/2000 | Tsai et al. | |
| 6,195,475 B1 | 2/2001 | Beausoleil, Jr. et al. | |
| 6,262,804 B1 | 7/2001 | Friend et al. | |
| 6,325,288 B1 * | 12/2001 | Spitz | 235/462.12 |
| 6,700,997 B1 * | 3/2004 | Spitz | 382/112 |
| 6,795,593 B2 | 9/2004 | Silverbrook et al. | |
| 7,204,416 B1 | 4/2007 | Desai et al. | |
| 7,660,489 B2 | 2/2010 | Silverbrook et al. | |
| 2007/0140563 A1 * | 6/2007 | Kano et al. | 382/190 |
| 2012/0085821 A1 * | 4/2012 | Cheng | 235/436 |

* cited by examiner

*Primary Examiner* — Anand Bhatnagar
(74) *Attorney, Agent, or Firm* — Island Patent; F. Scott Tierno

(57) ABSTRACT

A verifier apparatus including a linear imaging unit for an iterative capturing and collecting of data sample sets of linear image data, along with a position value that is associated with each collected data sample set. A preferred method calls for a post processing of collected data sample sets and position values to yield imaging data representing a plurality of evenly spaced and parallel imaging lines, which may then be processed to determine one or more print quality attributes. This abstract is provided to comply with rules requiring abstracts, and is submitted with the intention that it will not be used to interpret or limit the scope and meaning of the claims.

11 Claims, 6 Drawing Sheets

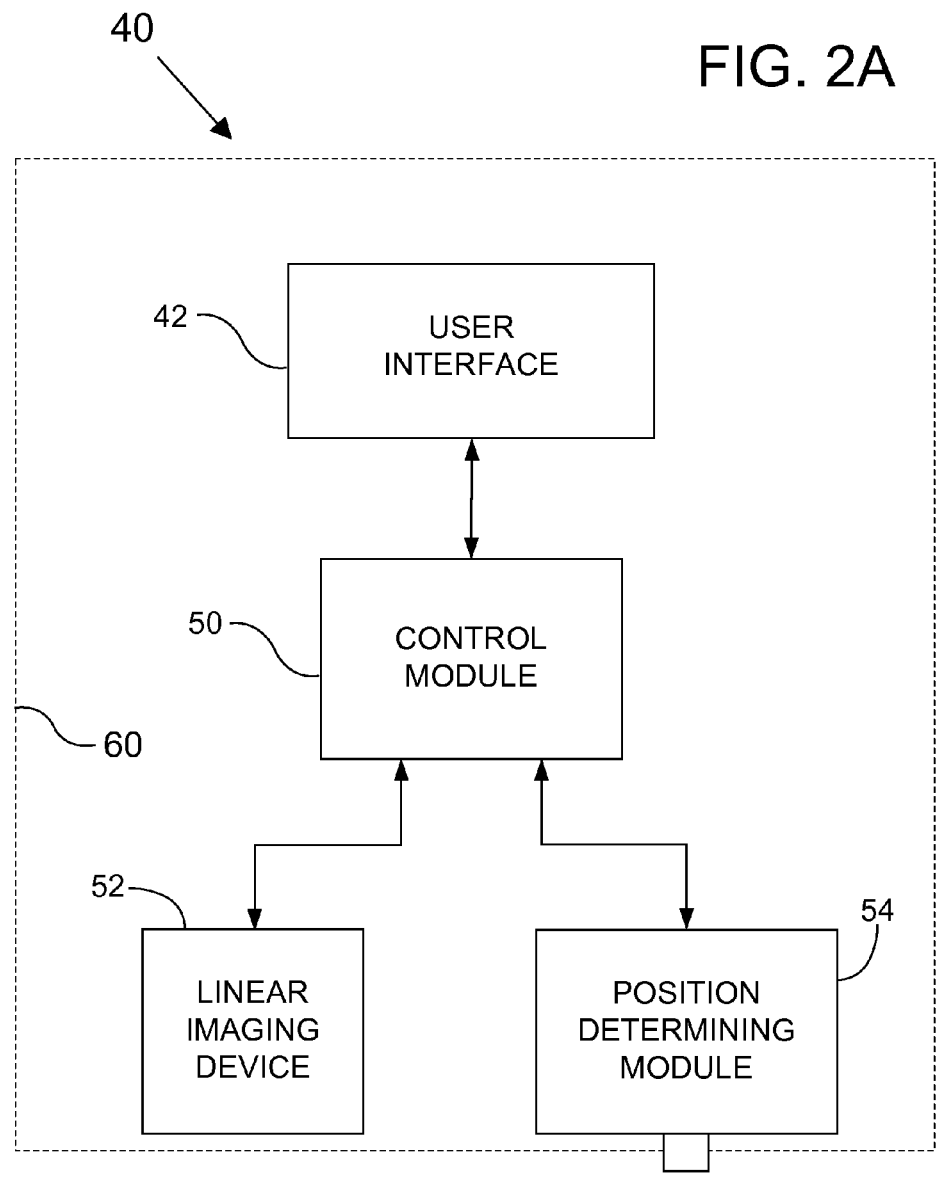

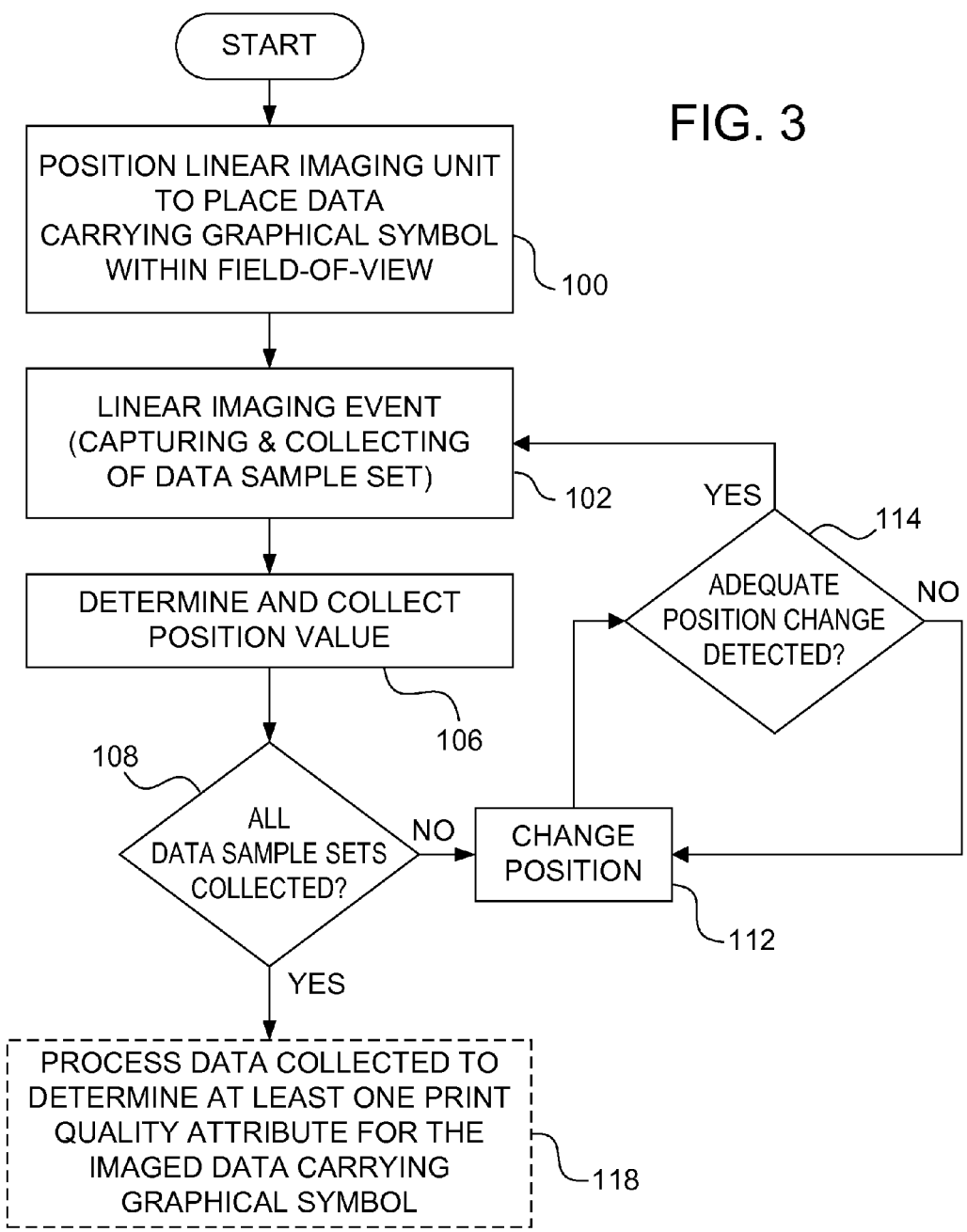

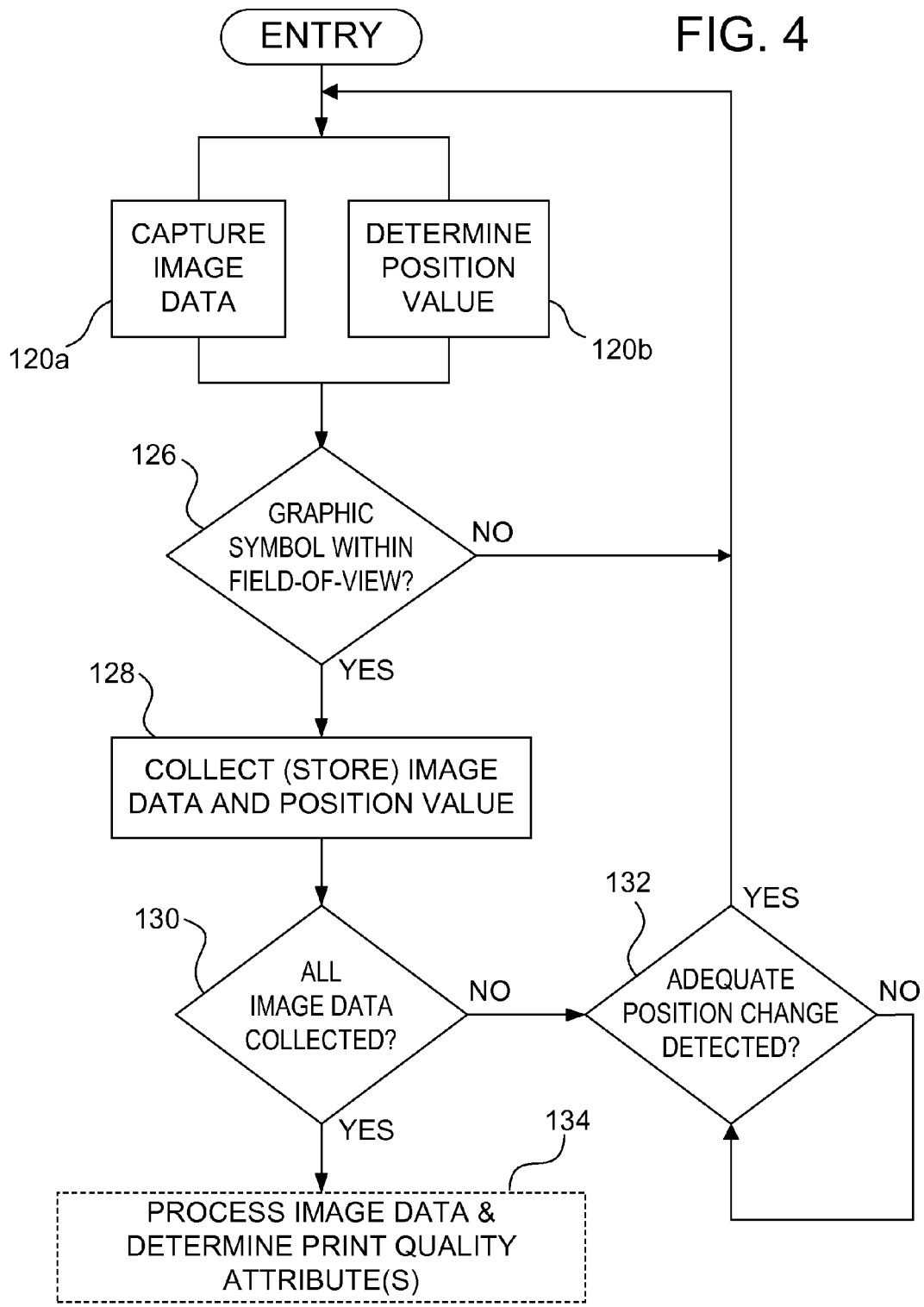

HAND OPERATED LINE VERIFIER WITH POSITION DETERMINING MODULE

TECHNICAL FIELD

The presently disclosed invention relates most generally to verifier systems used to evaluate the print quality of data carrying graphical symbols, including 1-dimensional and 2-dimensional barcode symbols. More particularly, the present invention relates to a verifier having an imaging head that employs a linear imaging unit, or equivalent scanning arrangement, along with a position indicating module for determining changes in position as the imaging head is moved (slid) along the height of the data carrying graphical symbol. The linear (line) imaging unit of the apparatus is structured for enabling data sample sets of imaging data to be captured and collected, along with associated or corresponding position values. The imaging data and position values are collected in an iterative manner in order to produce a number of spaced imaging lines, which are useful for print quality evaluation purposes.

BACKGROUND

Those skilled in the art of evaluating the print quality of data carrying graphical symbols understand the need to generate a plurality of evenly spaced scan or imaging lines. Importantly, the plurality of imaging lines are preferably taken substantially orthogonally across the elements of a graphical symbol, and preferably with each at a different position along the height of the symbol. This is particularly important when there is a need to provide full and complete print quality verification to well known industry standards. For example, typically verifiers that provide a quality reporting that meets ANSI, AIM, ISO, and/or other existing industry quality standards, will often employ imaging sample data from at least 10 discrete imaging positions spaced along the height of the imaged data carrying graphical symbol.

A number of varied approaches have been utilized for generating a group of (preferably evenly) spaced and substantially parallel scan or imaging lines. A first well known approach mounts a line scanning device in position to scan data carrying graphical symbols as they are printed on a printing web. In this case the media upon which the data carrying graphical symbol is printed is moving past the scanning device, and inherently provides spaced parallel scans as the graphical symbol moves into and out of the field-of-view of the scanner unit. In similar fashion, the prior art teaches the technique of "raster laser scanning" wherein a linear scanner is employed in a stepped fashion, to produce a large plurality of very closely packed (and inherently evenly spaced) scan lines of a target indicia. In each of these approaches, the rate of motion between the scanning means and the indicia is known—making it relatively easy to produce and or select a plurality of suitably spaced scan or imaging lines.

Another more recent approach is to employ an imaging device to image the entire data carrying graphical symbol, and often a surrounding portion of the substrate upon which the graphical symbol is printed. Once the area containing the graphical symbol is imaged and stored, a post-processing can be applied to determine a plurality of 'virtual imaging lines', which may also be termed virtual scan lines. In this latter case, actual scanning is replaced by a software algorithm that selects a subset of imaging data samples, and processes them to provide an indication of the print quality of the imaged data carrying graphical symbol.

Each of the cited prior art approaches has another characteristic in common: the imaging or scanning device is fixed in a pre-selected location, or alternately movably mounted so that any motion of the imaging or scanning means is known, controlled, and relatively steady/predictable.

A truly low-cost method of capturing and collecting a plurality of evenly spaced imaging lines involves the manual use of a linear scanning or imaging means. For example, it is known in the art to employ a linear scanning means, such as a linear laser scanner or a linear imaging CCD device, and simply have the operator provide a sliding or sweeping motion. That is, the linear imaging unit includes a linear imaging device which is oriented to image across the elements of a data carrying graphical symbol, so that as the linear imaging unit is moved along the height of the symbol, a plurality of imaging events cause a plurality of data sample sets comprising linear image data to be collected. Importantly, if position information is also collected with each data sample set of imaging data collected, it is possible to process the collected data sample sets and select a subset to yield a plurality of preferably evenly spaced imaging positions along the height of the imaged data carrying graphical symbol. As shown in FIG. 1A, processing can be employed to reduced a possibly large plurality of collected data sample sets to yield a subset of data sample sets that are suitably spaced (as clearly depicted in FIG. 1A). It may also be noted that the processing of the image position values will enable the nearly ideal depiction of FIG. 1A to be realized—almost independent of the rate at which the linear imaging unit is swept from a first or start-of-scanning position to a second or end-of-scanning position. Further, a linear imaging unit including a position determining module enables a capturing and collecting of the data sample sets at a sufficiently high rate, such that when processed a plurality of spaced imaging lines (or positions) as depicted in FIG. 1B may be determined. It is contemplated that with a high speed linear imaging unit, it should certainly be possible to provide several data sample sets for each row of the stacked portion 34 of the 2-dimensional data carrying graphical symbol 20*a* of FIG. 1B.

Accordingly, what is needed is a low-cost linear imaging arrangement that is capable of capturing and collecting a plurality of data sample sets of imaging data taken at discrete positions along the height of an imaged data carrying graphical symbol, while also collecting a unique and or relative position value for each collected data sample set. A processing of collected data sample sets and associated position values may then be employed to select a subset of data sample sets for additional processing to determine at least one or more print quality attributes for the imaged graphical symbol. More specifically, it would be most preferable to provide a means and method wherein a plurality of spaced imaging lines or scans may be captured and collected, with an associated position value also stored with each image line captured. In this way, if an operator is moving or sliding the linear imaging unit at a non-uniform or inconsistent rate, the position information can be employed to select a subset of captured imaging lines, which provides the desired plurality of substantially evenly spaced imaging lines. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, a means and method are provided for enabling an imaging of a data carrying graphical symbol resulting in a capturing and collecting of linear image data, including a plurality of data sample sets. As each data sample set is collected, a corresponding position value is also collected that is indicative of at least one of a relative or an absolute position along the height of the imaged data carrying graphical symbol. Preferred embodiments of the invention most preferably call for a capturing and collecting of linear image data samples taken at each of a plurality of spaced positions along a height 'H' of a data carrying graphical symbol. Once a plurality of data sample sets of imaging data, and the corresponding position values are collected and available, a processing and analysis of selected data sample sets may be conducted to determine at least one print quality attribute of the imaged data carrying graphical symbol.

Preferred embodiments of the invention may most preferably provide for an oversampling, and a collecting of more data sample sets and position values than are required for print quality evaluation purposes. An initial processing of the collected imaging data (and position values) may most preferably result in a selecting of a subset of data sample sets. The selected subset of data sample sets would preferably represent imaging data for a plurality of evenly spaced and possibly nearly ideal imaging positions. For example, the nearly ideal imaging lines 24a through 24k depicted in FIG. 1A, or the ideal imaging lines 24a through 24g in FIG. 1B, would represent a selected subset of imaging positions—possibly a small fraction of the total positions at which data sample seta have been collected. Once selected, the subset of data sample sets may then be employed for processing to determine at least one quality attribute of the print quality of the imaged data carrying graphical symbol.

BRIEF DESCRIPTION OF THE DRAWINGS

In the drawings, like elements are assigned like reference numerals. The drawings are not necessarily to scale, with the emphasis instead placed upon the principles and features of the present invention. Additionally, each of the embodiments depicted are but one of a number of possible arrangements utilizing the fundamental components and concepts of the present invention. The drawings are briefly described as follows:

FIG. 2A depicts a high level block diagram of a hardware embodiment of a structure that will support the methods of the invention, and enable a reporting of at least one print quality attribute.

FIG. 3 provides a high level flowchart depiction of a first possibly preferred embodiment of a method of the present invention.

FIG. 4 is a flowchart depiction of another possibly preferred embodiment of a method of the present invention.

PARTIAL LIST OF REFERENCE NUMERALS

Figure 1A:
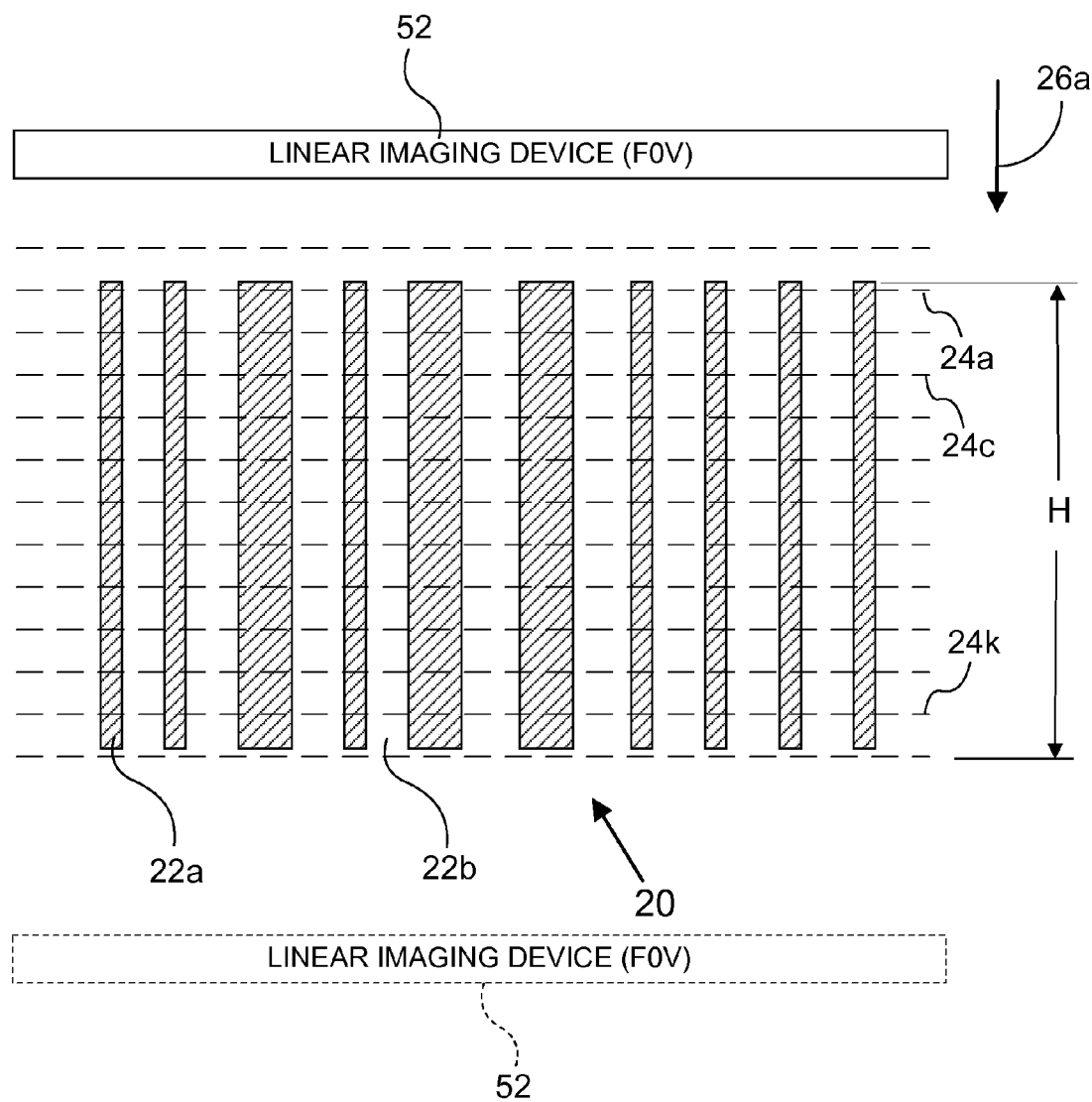
FIGS. 1A and 1B depict examples of a plurality of ideal or nearly ideal imaging lines (or equivalently, scan lines), which may represent a selected subset of a total number of imaging lines actually employed.

| | |
|---|---|
| 20 | data carrying graphical symbol (1-dimensional) |
| 20a | data carrying graphical symbol (2-dimensional) |
| 22a | bar elements |
| 22b | space elements |
| 24a | first imaging line |
| 24b | second imaging line |
| 26 | direction of motion (of 52) |
| 30 | start/stop elements or portion (of 38) |
| 34 | 2D stacked portion |
| 36 | 2D image or image region |
| 40, 40a | linear imaging unit |
| 42 | user interface (of 40/40a) |
| 44 | switch means |
| 46 | annunciators |
| 50 | control module |
| 50a | microcomputer control module |
| 52 | linear imaging device |
| 54 | position determining module |
| 54a | rotary pulse generator |
| 54b | surface contacting member (of 54) |
| 54c | shaft (of 54a) |
| 56 | communication channel |
| 58 | interface |
| 60 | housing (of 40) |

DETAILED DESCRIPTION OF EMBODIMENTS OF THE INVENTION

It is important to establish the definition of a number of descriptive terms and expressions that will be used throughout this disclosure. As will also be discussed and defined in the following sections and claims, the term 'linear imaging unit' is to be broadly defined and may include any of a variety of possible linear imaging devices. Possible linear imaging devices may including linear laser-based scanners, linear CCD-based imaging devices (with appropriate optics and source illumination), as well as other arrangements known to skilled persons. A first function required of an included linear imaging device of the linear imaging unit is to realize linear imaging events. Each linear imaging event provides for a linear imaging or scanning across a data carrying graphical symbol—to be imaged and evaluated. Such a linear imaging event may also be termed a linear imaging activity. It may be noted that a linear imaging at a selected position along the height 'H' of a data carrying graphical symbol will produce a plurality of imaging data samples, which will be termed a 'data sample set'. Accordingly, each linear imaging event will result in a capturing and collecting (storing) of a data sample set. In addition, each linear imaging event will also result in a determining and or collecting of an associated position value. As such, each data sample set collected has associated therewith a position value, which is indicative of the relative position along the height of the data carrying graphical symbol where the imaging event occurred. The term 'print quality attribute', which is well known to skilled persons, will be utilized to describe a result produced by the method of the invention. More specifically, a selected subset of a total plurality of the collected data sample sets are preferably processed and analyzed to determine at least one quality indicator or attribute, which can be reported to clearly indicate the print quality of the just scanned data carrying graphical symbol.

Continuing, the term 'substantially' will be employed as a modifier to indicate either exactly or statistically close to the given feature, structure, or characteristic. For example, the phrase 'substantially constant distance' may indicate that a distance is exactly fixed, or within +/−1 or 2 percent of a nominal and defined exact value. In like fashion, the term 'substantially equally spaced', as applied to a plurality of related imaging positions, can be assumed to mean that the distance or spacing between imaging positions is exactly equal, or within +/−1 or 2 percent. Importantly, the terms 'couple', 'coupled to', 'coupling', and the like, are to be understood to mean that two or more described items or limitations are either directly connected together, or alternately, connected to each other via one or more additional, possibly implied or inherent structures or components. Other important terms and definitions will be provided, as they are needed, to properly define the present invention and its associated novel characteristics and features. In addition, the terms and expressions employed herein have been selected in an attempt to provide a full, complete, and accurate description of the invention. These terms may very well have equivalents known to skilled individuals, which may be long established in the art. As such, the terminology employed has been carefully chosen and is intended for illustration and completeness of description, and may very well have equivalents that are known in the art, but not employed here.

Figure 1B:
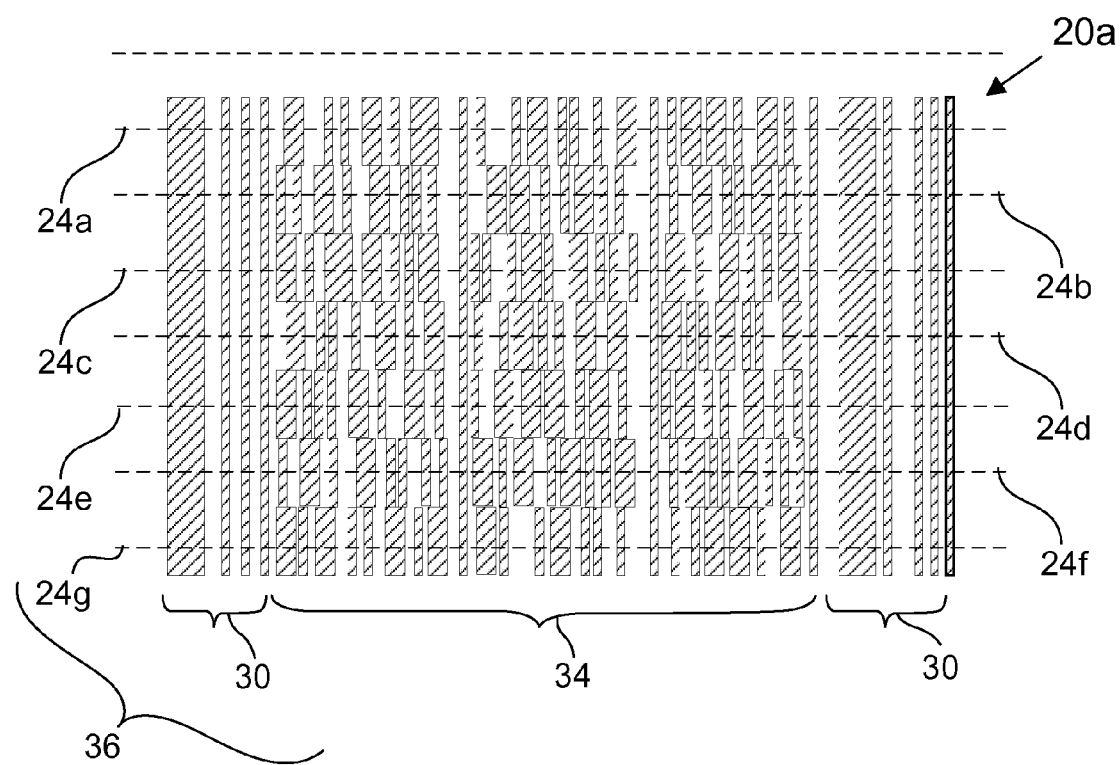

Referring now to the drawings, FIGS. 1A and 1B each depict a possibly most ideal plurality of linear imaging positions at which imaging (or scan) lines are desired. For example, as shown in FIG. 1A, a conventional 1-dimensional barcode symbol is depicted and representative of one possible data carrying graphical symbol 20. As shown, the data carrying graphical symbol 20 is composed of bar elements 22a and space elements 22b, which are interleaved. By employing a suitable linear imaging device, with a sufficiently wide field-of-view, a linear imaging event may result in the collecting of linear image data in the form of a data sample set. The data sample set represents a grouping of a plurality of linear image data samples preferably taken across the entire width of the data carrying graphical symbols at a selected or current position. As discussed hereinbefore, the imaging lines and positions depicted in FIG. 1A preferably represent a selected subset of the total imaging lines that are collected and captured along the height 'H' of the data carrying graphical symbol. The selected subset, as clearly shown in FIG. 1A, provides a plurality of equally spaced imaging lines that are generally required for industry standard print quality evaluation.

Turning briefly to FIG. 1B, another embodiment of a data carrying graphical symbol 20a is depicted as a 2-dimensional barcode indicia. In this case the data carrying graphical symbol 20a is structured having a left group of full height start/stop elements 30, followed by a center 'stacked' portion 34, which is in turn followed by another region of start/stop elements 30. The center stacked portion 34 may also be described as being composed of a stack of reduced height 1-dimensional barcodes. Clearly the imaging of the data carrying graphical symbol 20a presents a somewhat different challenge, especially if a plurality of imaging lines are to be taken within each reduced height 1-dimensional barcode of the stacked portion 34 (not illustrated). Therefore, it must again be stressed that the imaging lines 24a through 24g of FIG. 1B would typically represent a reduced and or selected subset of the total imaging lines that were actually captured and processed. Further, it is the position values that are generally considered and processed in order to produce the idealized and strongly preferred selected subset of imaging lines (or equivalent imaging positions) depicted in FIGS. 1A and 1B.

Turning to FIG. 2A, a high level depiction of an embodiment of a linear imaging unit 40 of the invention is provided. The linear imaging unit 40 of FIG. 2A includes a user interface 42, which is functionally and operatively coupled to a control module 50. At least two important peripherals are preferably also coupled to the control module 50: the linear imaging device 52 and the position determining module 54.

For a proper imaging of the data carrying graphical symbol 20/20a, an operator would most likely place the data carrying graphical symbol within the field-of-view (not explicitly illustrated) of the linear imaging device 52. In a most preferred embodiment of the linear imaging unit 40, the operator would be required to place a housing of the linear imaging unit 40 in contact with a surface or substrate upon which the face of the data carrying graphical symbol is placed or printed. This arrangement would enable an operator to readily place the face of the data carrying graphical symbol at the correct focal distance for in-focus imaging. In addition, such an arrangement would most preferably enable the operator to sweep or slide the linear imaging unit 40 and the linear imaging device 52 thereof from a first imaging position (say near the top of the height of the data carrying graphical symbol) down to a final imaging position (say slightly below the bottom of the elements composing the data carrying graphical symbol). Imaging events would then result in the linear imaging device 52 capturing a data sample set of imaging data for the imaged position. As understood by skilled persons, the imaging data would provide a plurality of imaging data samples representative of the reflectivity of the imaged portion of the data carrying graphical symbol 20/20a.

Importantly, when an imaging event is realized, the linear imaging device 52 communicates the data sample set to the control module 50, and at substantially the same time, the position value is determined and or communicated by the position determining module 54 to the control module 50 (for collecting/storing). If a large amount of image data memory is available, the process of capturing and collecting data sample sets and associated position values may be conducted at a maximum desired rate, as the linear imaging device 52 of the linear imaging unit 40 is moved (swept) along the height 'H' of the data carrying graphical symbol 20/20a.

Figure 2B:
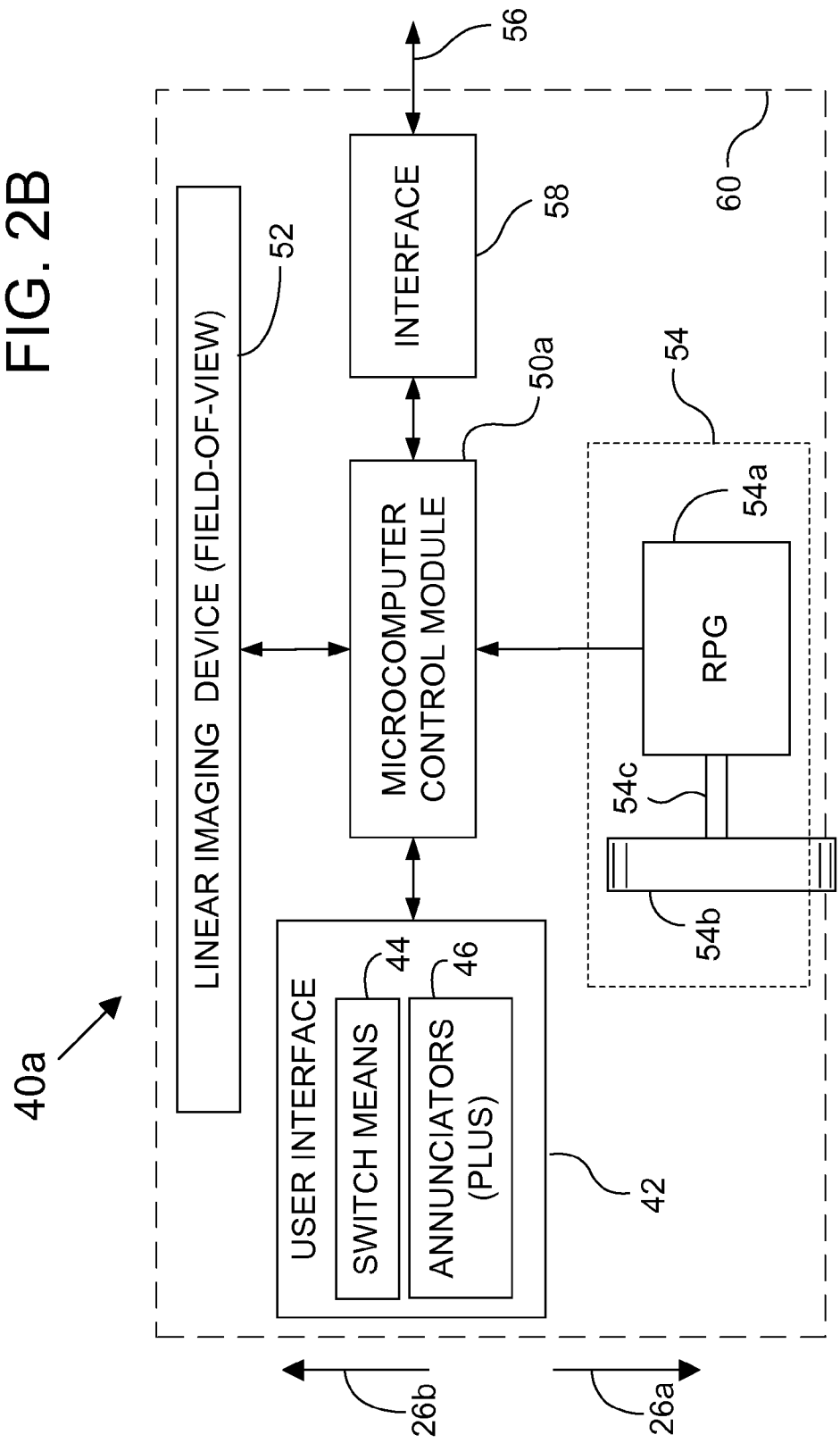
FIG. 2B is a more detailed functional representation of an embodiment of the invention, which is consistent with the depiction of FIG. 2A.

Turning now to FIG. 2B, a more functional and detailed block diagram of the linear imaging unit 40a is provided, which is consistent with the representation of FIG. 1A. As shown, the linear imaging device 52 has associated therewith a field-of-view, which must generally be wide enough to enable an imaging across (orthogonal to) all the bars 22a and spaces 22b of the data carrying graphical symbol 20/20a while also being at the correct in-focus (focal) imaging distance. In a preferred embodiment of the present invention, the data carrying graphical symbol 20/20a would be at a proper imaging distance, and within the field-of-view of the linear imaging device 52, when the linear imaging unit 40a is placed down upon a surface containing the face of the data carrying graphical symbol. In addition, a preferred housing 60 of the linear imaging units 40/40a may certainly include friction reducing runners or small rolling wheels (not illustrated, but known to skilled persons). This would support the desired linear sliding motion that is required to image along the height of the data carrying graphical symbol. Also, when placed down upon a substrate or surface containing the face of the graphical symbol, a surface contacting member 54b will be able to detect changes in position as the linear imaging unit 40/40a is moved along the height of the data carrying graphical symbol 20/20a. For example, as depicted in FIG. 2B, a rotary pulse generator (RPG) 54a may have a surface contacting member 54b coupled thereto by way of a shaft 54c. With this structure, the linear imaging unit 40a is capable of capturing position values while substantially simultaneously collecting data sample sets of imaging data.

Returning to FIG. 2B, a microcomputer control module 50a may be preferably provided, which may represent an integrated version of the control module 50 of FIG. 2A. As shown in FIG. 2B, the linear imaging unit 40a is preferably again structured with each of the user interface 42, the position determining module 54, and the linear imaging device 52 operatively coupled to the microcomputer control module 50a. Also included is an interface 58 (which may be substantially provided by the microcomputer control module 50a) that may serve one of several possible purposes when included with embodiments of the present invention. When considering a substantially self-contained embodiment of the invention, the linear imaging unit 40a may provide all the processing of the collected data sample sets and the associated position values locally. This processing (and analysis) may occur as data sample sets are being collected, or alternately after all data sample sets have been collected. Regardless of when the processing of image date occurs, the processing and analysis of the position values will most preferably result in a determining of a selected subset of data sample sets, which may then be processed and analyzed to determine at least one print quality attribute for the imaged data carrying graphical symbol. In this case, an included interface 58 would enable print quality results to be downloaded and saved external to the linear imaging unit 40a—if desired or required.

Alternately, the microcomputer control module 50a may be configured to just capture and collect data sample sets and associated position values. With this arrangement, the data sample set and position values are communicated (downloaded) to a second/remote computing system (not explicitly shown) as they become available to the control module 50a. Once the collected image data has been downloaded, processing and analysis may be conducted by the remote computing system. The remote computing system may then report the print quality results, or the results may be communicated back to the linear imaging unit 40a for reporting therefrom. It should be understood that the communication channel 56 may be established as a hardwired physical link or wireless as an RF or optical link.

As shown in FIG. 2B, a preferred user interface 42 may include at least one of a switch means 44, such as a simple momentary pushbutton switch, along with at least one annunciator 46. Contemplated annunciators 46 may include sounders, buzzers, light emitting elements, character displays, etc. The included annunciator(s) 46 may certainly provide optical or audio feedback to the operator.

The position determining module 54 may most preferably include a position determining device that may provide a tick or pulse for every 0.05 to 2 millimeters of detected motion. The actual number of pulses per unit distance traveled would generally be related to the diameter of the surface contacting member 54b, the resolution of the included rotary pulse generator (RPG) 54a, and other possible implementation details including the type of interface employed to sense output signals from the rotary pulse generator 54a of the position determining module 54. For example, as appreciated by skilled persons, well known rotary pulse generators are available that produce either one or two digital (pulsed) outputs. The outputs of the rotary pulse generators may then be coupled to the control module 50/50a, enabling the control module to sense a 'direction of motion', such as 26a or 26b (as depicted in FIG. 2B). In addition, properly interfaced rotary pulse generators will enable a detecting and processing of motion speed variations, as well as changes in direction (e.g., by way of quadrature decoding).

Turning now to FIG. 3, a flowchart of a first possible and generally simplified method of the invention is illustrated. As shown, the method may commence at step 100 with a positioning (locating) of the linear imaging unit 40/40a so that a data carrying graphical symbol is within a field-of-view of the linear imaging device 52. Once suitably placed within the field-of-view of the linear imaging device 52, a proper and in-focus imaging may be realized. Next, a linear imaging event may occur at step 102, and a data sample set is captured and collected. Each data sample set includes a plurality of image data samples taken linearly across a plurality of elements of the data carrying graphical symbol. Preferably, at substantially the same time or just prior to the imaging event of step-102, at step 106 a position value is determined and collected. Accordingly, it must be understood that the position value may actually be first determined and or collected, and then the data sample set may be captured and collected. Regardless of the order of determining the data sample set and position value, they are said to be 'associated' or 'paired', and provide what may be termed imaging related data for the selected and imaged position along the height of the data carrying graphical symbol. As such, this first portion of the method of FIG. 3 represents one 'iteration' of an imaging event, wherein both a data sample set and a position value are collected and retained for future processing.

Returning to FIG. 3 at step 108 a check is made to see if all data sample sets that are required for a print quality evaluation have been collected. If so, then at step 118 a processing of collected data sample sets and associated position values may be effected to determine and report on the print quality of the imaged data carrying graphical symbol.

If however at step 108 it is determined that all required data sample sets have not been collected, then there is a need to change from the most recently imaged position—the selected position along the height of the data carrying graphical symbol wherein the last imaging event occurred—to a new imaging position. The position determining module 54 or an equivalent module will generally be employed to determine when an operator has moved the linear imaging unit 40/40a to a next imaging position. At step 112 a position change is assumed, with step 114 providing a check to determine if the position change is adequate. For example, if a rotary pulse generator 54a is included, then there may be a requirement for 1, or 5, or any preselected number of pulses (ticks) of distance be detected before the next imaging position is reached. If at step 114, it is determined that an adequate position change has not occurred, an additional position change is required and step 112 is repeated. The loop of step 114 and step 112 is repeated until the next desired imaging position is reached.

The loop of steps 102, 106, 108, 112, and 114 repeats until all desired data samples sets and associated position values have been collected. Again, once the required data sample sets are available, step 118 may be employed.

It is to be understood that step 118 is to be broadly defined, and will result in the determining and most preferably reporting of at least one print quality attribute to an operator of the linear imaging unit 40/40a. For example, one embodiment of the processing step 118 may provide for the processing of a possibly large plurality of data sample sets, by considering their associated position values, to yield an intermediate result in the form of a plurality of spaced imaging lines (and the corresponding data sample sets). The reduced plurality of data sample sets may then be processed and or analyzed to determine the needed print quality attributes, which may be most preferably reported to an operator of the linear imaging unit 40/40a.

Turning now to FIG. 4, a more detailed embodiment of a possible method of the invention is provided. At steps 120a and 120b, an imaging event results in a capturing of a data sample set (at 120a) and a position value (at 120b). The activities of 120a and 120b may most preferably occur at substantially the same time. Next, at step 126 a check is made by employing the data of the data sample set to determine if the data carrying graphical symbol is within the field-of-view of the linear imaging device 52. For example, a first decode may be attempted, or a data analysis performed to see if a succession of alternating bar elements and space elements were present. Regardless of the method employed to determine if the data carrying graphical symbol is within the field-of-view of the linear imaging device 52, if the data carrying graphical symbol is determined not to be positioned within the field-of-view for proper imaging thereof, the loop of steps 120a, 120b, and 126 is repeated until it is determined at step 126 that the data carrying graphical symbol is within the field-of-view.

Once it is determined that the data carrying graphical symbol is within the field-of-view of the linear imaging device 52, at step 128 the data sample set collected in step 120a and the position value collected in step 120b are captured (stored), and retained for later processing. At step 130 a check is made to determine if a total or full plurality of required data sample sets and position values have been collected. If so, at step 134 processing and or analysis of collected data sample sets and associated position values may most preferably result in:

a) a first result of determining a selected subset of data sample set that will be further processed; and b) a second result in the form of one or more print quality attributes, which may be immediately reported to an operator.

As shown in FIG. 4, if at step 130 it is determined that all needed or required imaging data has not been collected, step 132 is executed until an adequate position change has been detected, and the loop including steps 120a/120b, 126, 130, and 132, is repeated in an iterative manner.

As appreciated by skilled individuals that have fully reviewed this disclosure, exactly when the linear imaging device 52 of the linear imaging unit 40/40a is activated, to commence imaging activities, may be controlled or effected in a variety of ways. For example, if the linear imaging unit is battery powered, and lower power operation is an important consideration, then an operator activated switch means 44 (of FIG. 2B) may be provided, possibly as a simple and well located momentary pushbutton switch. For example, this switch may provide a basic 'trigger' function. In this case, the operator may simply be required to press the pushbutton switch when (or as) the linear imaging unit 40/40a is being placed in position for proper imaging activities. The linear imaging device 52 of the linear imaging unit may then be arranged to capture and collect a data sample set (for later or immediate processing/analysis).

When considering embodiments wherein a pushbutton is not included, once the linear imaging unit 40/40a is energized (e.g., removed from a cradle or switched on), a periodic imaging event may be employed to determine if a data carrying graphical symbol is within the field-of-view of the linear imaging device 52. For example, an imaging event and check may be performed every 0.1 seconds, until the data carrying graphical symbol is detected within the field-of-view of the linear imaging device 52. In addition, it is certainly contemplated that rate of imaging events, and therefore the rate at which data sample sets and associate position values are collected, will be directly associated with information received from the position determining module 54. For example, once it is determined that linear imaging activities should commence, the actual start of imaging and rate at which data sample sets are collected may be controlled or throttled by the position value information provided by the position determining module 54, which is preferably communicated to the microcomputer control module 50a. A specific embodiment may, for example, call for 5 to 10 ticks or pulses from an included rotary pulse generator 54a of the position determining module 54.

Returning briefly to step 130 of FIG. 4, the methods of the present invention generally require a check or determination of when to stop collecting data sample sets and associate position values as well. This check or determination may be based on any of a variety of criteria and or parameters. Most preferably the actual number of iterations employed for the capturing and collecting of data sample sets may be terminated by any of the following:

1) a collecting of a fixed pre-determined number of data sample sets and position values;

2) a filling a pre-determined number of memory positions that are available to hold data sample sets and position values;

3) a detecting of a moving of a linear imaging device so that the data carrying graphical symbol is no longer in the field-of-view of the imaging device;

4) detecting a maximum change in the position values, from a first starting position value of the first imaging position to a final position value for a most recently collected data sample set;

5) detecting an operator input, such as the pushbutton switch being pressed or released; and 6) detecting a ceasing of pulses from an included position determining module (e.g., a timeout feature), indicating the sweeping motion is complete.

Accordingly, as indicated above, the end of imaging events may be automatic and independent of a direct operator input (e.g., a memory being fully filled or a detecting of a ceasing of the sweeping motion)—and therefore not involve direct operator input. Alternately, the linear imaging unit 40/40a may certainly be structured such that the releasing of the operator pushbutton causes a termination of the current imaging and processing activities.

As skilled persons will appreciate, the descriptions above provide but a few examples of a large number of possible methods that utilize the fundamental concepts of the present invention. Many variations are certainly possible. For example, the methods of FIGS. 3 and 4 may be arranged to begin processing a data sample set and corresponding position values once they have been collected—either locally or remotely. This may be readily implemented by providing a hardware (or software equivalent) structure such as a first-in-first-out (FIFO) memory buffer. For embodiments where the processing is provided by a remote computing system, a maximum rate may be utilized to collect each data sample set and associated position values, followed by an immediate downloading of the collected image related information to an available remote computing system. For example, as shown in FIG. 2B, the interface 58 may be employed to transmit data from the linear imaging unit 40a to the remote computing system (not illustrated) by way of communication channel 56. With these latter embodiments, even a rather modest version of an integrated microcomputer control module 50a would have enough memory to continually collect data sample sets and position values, and download them for processing substantially in parallel with the image data collecting activities, and substantially in real-time.

While there have been described herein a plurality of the currently preferred embodiments of the means and methods of the present invention, those skilled in the art will recognize that other and further modifications may be made without departing from the invention. As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A method for capturing and processing data sample sets, with the method useful for evaluating the print quality of a data carrying graphical symbol, the method including the steps of:
    a) capturing, collecting, and storing linear image data at one of a first or a next scanning position along the height of a data carrying graphical symbol, with linear image data being collected and stored in the form of a data sample set containing a plurality of image data samples taken across the scanning position;
    b) determining collecting, and storing a position value for the data sample set most recently captured in step-a);
    c) repeating step-a) and step-b) for a selected number of iterations, causing:
        i) an imaging at differing positions along the height of the data carrying graphical symbol; and
        ii) the collecting and storing of a plurality of data sample sets, including a plurality of associated and corresponding position values, enabling a subsequent processing of the collected data sample sets and position values for determining and reporting at least one print quality attribute.

2. The method in accordance with claim 1, wherein the first data sample set and associated position value collected and actually retained is determined by processing captured data sample sets, as they are collected, to determine when the data carrying graphical symbol is within the field-of-view of a linear imaging unit employed to image the data carrying graphical symbol.

3. The method in accordance with claim 2, wherein each successive data sample set and position value is captured, collected, and retained upon a detecting of a pre-defined change of position from the previous position value to a current position value.

4. The method in accordance with claim 2, wherein upon a capturing and collecting of each successive data sample set and an associated position value, a processing of the collected data sample sets, by way of an analyzing of each position value, is employed to determine at least one of:
    a) a subset of data sample sets that will actually be analyzed to determine at least one print quality attribute;
    b) a print quality attribute; and
    c) if the data carrying graphical symbol was still within the field-of-view of the linear imaging unit.

5. The method in accordance with claim 2, wherein the pre-determined number of data sample sets and position values collected and actually retained is ten, with the position values utilized during processing to select substantially evenly spaced imaging positions along the height of the data carrying graphical symbol.

6. The method in accordance with claim 1, wherein the number of iterations, determining the total number of data sample sets and corresponding position values that are captured, collected, and stored is determined by at least one of:
    a) collecting a fixed pre-determined number of data sample sets and position values;
    b) filling a pre-determined number of memory locations available to hold data sample sets and position values;
    c) detecting a moving of the data carrying graphical symbol out of a field-of-view of an imaging device that is capturing and collecting the data sample sets;
    d) detecting a maximum change in the position values, from a first position value of the first imaging position to a final position value for a most recently collected data sample set;
    e) detecting an operator input; and
    f) detecting a ceasing of motion of the linear imaging unit.

7. A method for capturing and collecting linear image data, useful for evaluating the print quality of a data carrying graphical symbol, the method including the steps of:
    a) capturing and collecting linear image data at one of a first or a next position along the height of a data carrying graphical symbol, with the linear image data being collected in the form of a data sample set containing a plurality of image data samples taken across the position;
    b) determining and collecting a position value for the data sample set captured in step-a);
    c) repeating step-a) and step-b) for a selected number of iterations, causing:
        i) an imaging at differing positions along the height of the data carrying graphical symbol; and
        ii) the collecting of a plurality of data sample sets and corresponding position values, enabling a processing of the collected data sample sets and position values for determining and reporting at least one print quality attribute;
    d) wherein the step of determining and collecting a position value is realized by employing an included linear imaging unit having a position determining module utilizing a rotary pulse generator.

8. The method in accordance with claim 7, wherein the employing of the rotary pulse generator of the position determining module uses a quadrature decoding arrangement for enabling a direction of the motion of the linear imaging unit to be determined as the linear imaging unit is moved up, down, or up and down along the height of the data carrying graphical symbol.

9. The method in accordance with claim 7, wherein the employing of the rotary pulse generator of the included position determining module, further provides for including a surface contacting roller wheel, coupled to a shaft of the rotary pulse generator, such that when the roller wheel is contacting a surface containing the data carrying graphical symbol, as the linear imaging unit is moved up or down along the surface, there is a rotating of the roller wheel and shaft of the rotary pulse generator, causing an altering of a current position value.

10. The method in accordance with claim 9, wherein an additional step of processing collected data sample sets and associated position values is employed to select a subset of data sample sets that may subsequently be analyzed to determine at least one print quality attribute.

11. The method in accordance with claim 10, wherein the selected subset of data sample sets is further processed and analyzed to determine at least one print quality attribute.

* * * * *